United States Patent [19]
Gauthier et al.

[11] Patent Number: 5,833,375
[45] Date of Patent: Nov. 10, 1998

[54] SYSTEM AND METHOD FOR INTERFACING A RASTER PRINTER CONTROLLER WITH A PLURALITY OF PRINT ENGINES

[75] Inventors: Forrest P. Gauthier, Maineville; Dimitrije L. Jovic, Cincinnati, both of Ohio

[73] Assignee: Varis Corporation, Mason, Ohio

[21] Appl. No.: 717,477

[22] Filed: Sep. 20, 1996

[51] Int. Cl.[6] .................................................. B41J 03/54
[52] U.S. Cl. .............................. 400/82; 347/117; 395/114
[58] Field of Search .................................. 400/61, 82, 76; 395/114; 347/5, 117

[56] References Cited

U.S. PATENT DOCUMENTS

| | | | |
|---|---|---|---|
| 4,161,634 | 7/1979 | Bellisio | 340/825 |
| 4,551,721 | 11/1985 | Kozlik | 340/370 |
| 4,638,313 | 1/1987 | Sherwood et al. . | |
| 4,727,475 | 2/1988 | Kiremidjian | 364/200 |
| 4,849,752 | 7/1989 | Bryant | 340/825 |
| 4,982,185 | 1/1991 | Holmberg et al. | 340/825 |
| 5,204,669 | 4/1993 | Dorfe et al. | 340/825 |
| 5,206,857 | 4/1993 | Farleigh | 370/375 |
| 5,276,813 | 1/1994 | Elliott et al. | 395/275 |
| 5,465,251 | 11/1995 | Judd et al. | 370/54 |
| 5,467,436 | 11/1995 | Rodi et al. | 395/114 |
| 5,504,843 | 4/1996 | Catapano et al. | 395/115 |
| 5,530,896 | 6/1996 | Gilbert | 395/829 |
| 5,574,951 | 11/1996 | Sawyer et al. | 395/865 |
| 5,580,177 | 12/1996 | Gase et al. | 400/61 |
| 5,596,416 | 1/1997 | Barry et al. | 358/296 |
| 5,606,349 | 2/1997 | Droit et al. | 347/9 |

*Primary Examiner*—Edgar S. Burr
*Assistant Examiner*—Steven S. Kelley
*Attorney, Agent, or Firm*—Thompson Hine & Flory LLP

[57] ABSTRACT

A printing system includes a plurality of print engines; a raster printer controller having a processor for generating the rasterized bitmap data; and a plurality of print engine communication devices, where each of the print engine communication devices are coupled to a corresponding one of the print engines to provide the rasterized bitmap data to the corresponding print engine. The print engine communication devices are coupled together with the raster printer controller in a daisy chain configuration by a data link. Each of the print engine communication devices includes a message processing circuit that is adapted to monitor data received from raster printer controller, execute commands embedded in data received, update a bitmap data memory storage buffer in the print engine communication device with rasterized bitmap data embedded in the data received from the raster printer controller. Further, the bitmap memory data storage buffer includes a status line for indicating a need for additional rasterized bitmap data, and the message processing circuit is also adapted to transmit a message on its output port indicative of the status line so that the raster printer controller is able to perform on-demand dispatching of the rasterized bitmap data to the print engines,

7 Claims, 4 Drawing Sheets

SYSTEM AND METHOD FOR INTERFACING A RASTER PRINTER CONTROLLER WITH A PLURALITY OF PRINT ENGINES

BACKGROUND

The present invention relates to digital and print-on-demand printing systems; and more particularly, to a high-speed printer controller system which is configured to control a multitude of print engines simultaneously.

Similar to the computer industry, which has moved from awkward and incompatible machines and software to user friendly, cross-platform capable systems; the industrial and commercial printing industry is also moving toward software and systems which simplify the technical requirements for performing a print job. Conventional print engine controllers are unable to control a plurality of print engines, especially a plurality of print engines having different marking technologies. Furthermore, conventional print engine controllers rasterize bitmap data at the resolution (i.e., dots per inch "DPI" or dot pitch) of the particular print engine which the controller is designed to operate. Thus, such print engine controllers cannot simultaneously control a plurality of print engines with different resolutions.

Accordingly, there is a need in the digital print-on-demand industry for a printer controller system which can interface with and control a multitude of print engines simultaneously; especially a plurality of print engines which may respectively include a corresponding multitude of different marking technologies or a corresponding multitude of print engines having different resolutions. There is a need for an on-demand mechanism which allows the dispatching of bitmap data to any of the multitude of print engines in any order and at any time. Furthermore, there is a need for an on-demand mechanism which is flexible and allows the various print engines and/or marking technologies to be interchanged within the system without having to reconfigure the software of the controller or redesign hardware of the controller.

SUMMARY OF THE INVENTION

The present invention provides a system and method for interfacing an on-demand type raster printer controller with a multitude of print engines, and which can dispatch the rasterized bitmap data to any of the print engines, in any order, and at any time. Furthermore, the present invention allows the mixing of various print engines and/or marking technologies which can be operated from the same controller. In one embodiment, the present invention provides a system for simultaneously controlling a multitude of print engines where the print engines are continuous-flow ink-jet print heads, or are even ink-jet print heads of different resolutions.

The present invention comprises a high-speed raster printer controller for operating a plurality of print engines. Each print engine includes a customized print engine communication device, hereinafter referred to as a "target adapter board" ("TAB"), which provides a direct interface between the print engine electronics and the controller. The controller and each TAB include a fiber optic input port and a fiber optic output port. Therefore, both the controller and the plurality of TABs have full duplex communications via fiber optics. The controller is attached to the plurality of TABs in a ring or daisy-chained fashion, such that the controller will transmit commands and data to the first TAB on the daisy-chain, and the commands and data will flow in the same direction along the daisy-chain to the rest of the TABs, and will eventually flow back to the controller. Furthermore, the controller is adapted to transmit rasterized bitmap image data to the TABs, and in turn to the print engines, in an on-demand manner.

The ring configuration allows all the TABs to see all of the data all of the time. This also provides a clean mechanism for the raster printer controller to receive print engine status from all of the print engines with minimal cabling requirements. Furthermore, use of fiber optics provides excellent electrical isolation and immunity from excessive high voltages associated with print engine electronics.

The raster printer controller has a multiplexed command/data-stream protocol structure at its fiber optic interface in which the controller transmits a command followed by the data associated with the command. The controller initiates all commands, and manages the allocation of fiber optic bandwidth to receive all print engine status. Each TAB is adapted to listen for commands addressed to it, and responds appropriately; and further, the TAB never responds unless commanded by the controller. Nevertheless, each TAB will retransmit the entire command/data-stream it receives on its fiber optic input port back to its fiber optic output port, and in turn, to the next TAB on the ring. This allows all of the TABs to see all of the controller commands and data, all of the time.

Each TAB includes a fiber optic receiver/decoder, a fiber optic encoder/transmitter, a standard discrete output bus, a standard discrete input bus, a bitmap data memory storage, and a high-speed fiber optic message processing circuit. The message processing circuit is adapted to manage the incoming and outgoing commands, to manage the TAB's hardware and to provide an interface to the print engine electronics. The message processing circuit monitors the fiber optic input and executes the commands transmitted by the raster printer controller if the commands are addressed to it. The message processing circuit also continuously retransmits the command/data-stream back to the fiber optic encoder/transmitter, supports the general purpose discrete output bus in response to the commands, reads the general purpose discrete input bus which can be translated into messages sent directly to the raster printer controller as status, and also manages the data update of the bitmap data memory storage when commanded by the raster printer controller.

The high-speed fiber optic message processing circuit also provides a standard interface to the TAB's optional CPU which can be used to manage higher level tasks as warranted by some types of print engines. Thus, the TAB's architecture is optimized by design to provide a clean and standard interface to a broad range of digital printers, and the general purpose discrete buses provide a possible means for the raster printer controller to easily interface to and support the general I/O requirements of a broad range of print engines.

In a preferred embodiment, each TAB is designed to be automatically addressable by the raster printer controller, which means that the plurality of TABs can be connected in any order and in any combination within the fiber optic ring, and that any number of TABs can be placed on the ring. The command/data-stream transmitted on the ring by the raster printer controller includes an address field, which specifies which TAB is to accept and execute the command embedded in the command/data-stream. Every TAB is set up with an identical predefined internal address, such as zero (e.g., address=0), and every TAB is configured to modify the address field (e.g., decrement the address field by one) of every command prior to retransmitting the command/data-stream back to the ring.

When the raster printer controller boots up, it does not know the number of TABs on the ring, nor the identities or the attributes of the print engines coupled to the TABs. Accordingly, on boot-up the raster printer controller will first transmit an initialization command on the ring. The address field of this initialization command will be modified by each of the TABs on the ring; and thus, upon receiving the initialization command back from the ring, the raster printer controller will be able to determine the number of TABs on the ring and will know how to address each of the TABs based upon the amount that the address field has been modified prior to receiving the initialization command back from the ring.

Immediately thereafter, the raster printer controller will send a configuration request command to the first TAB on the ring. This configuration request command is received by the first TAB because its internal address matches the address of the configuration request command. Thus, the first TAB responds to this configuration request by returning a configuration response message to the controller which indicates the particular identity and/or attributes (i.e., printer resolution) of the print engine that the TAB is interfacing with. Prior to retransmitting the configuration request command back to the ring, however, the first TAB will modify the address field of the command such that none of the other TABs will answer the command.

Once the print engine controller has received the configuration response command from the first TAB, the controller will send a second configuration request command to the ring with an address field calculated to be received by a second TAB on the ring, if it exists. Thus, the first TAB on the ring will retransmit this configuration request command back to the ring without responding to the command. This configuration request command is accepted by the second TAB because its internal address matches the modified address field of the configuration request command. The second TAB responds to this configuration request by returning a configuration response message to the controller which indicates the particular identity and/or attributes of the print engine that the second TAB is interfacing with. Prior to retransmitting the configuration request command back to the ring, however, the second TAB will again modify the address field of the command such that none of the other TABs will answer the command.

This sequence of sending configuration request commands to the ring with progressively modified address fields will be repeated until the raster printer controller has received configuration response messages from all of the TABs on the ring. At this point the raster printer controller will know how many TABs are on the ring, how to address each of the TABs on the ring, and the identity and/or attributes of every print engine coupled to a TAB on the ring. This makes cabling very simple and straightforward since the ring can be attached in any order, and the dynamic addressing scheme performed at every boot-up eliminates the need to physically reconfigure the TABs' internal addresses when the ring configuration changes. This scheme also helps to facilitate the mix of different marking technologies having different resolutions on the same ring because the raster printer controller will know the characteristics and configuration of all the print engines on the ring.

The present invention, in one embodiment, also provides a mechanism to simultaneously control a multitude of ink-jet units configured as stroke machines. Each ink-jet unit is coupled to a corresponding TAB on the ring, and the TAB is controlled by the raster printer controller to deliver stroke data to its corresponding ink jet unit on every piezo cycle all the time. This data is normally null data unless instructed by the raster printer controller command such as "Print Trigger," "Synthesize Stroke Clock," "Reset Piezo Phase," etc. The raster printer controller's multiplexed commands/data-stream protocol allows the controller to embed a "Print Trigger" command within the command/data-stream at any time; thus, this mechanism provides real-time print trigger generation to the ink jet units.

Accordingly, it is an object of the present invention to provide a raster printer controller with a system and method to dispatch rasterized bitmap data to a plurality of print engines in an on-demand manner; to allow the mixing of various print engines and/or marking technologies to run from the same controller; to provide a clean mechanism for the controller to receive print engine status from the plurality of printers with minimal cabling requirements; and to provide full electrical isolation between the print engines and the controller. These and other objects will be apparent from the following description, the accompanying drawings and the appended claims.

DETAILED DESCRIPTION

Figure 1:
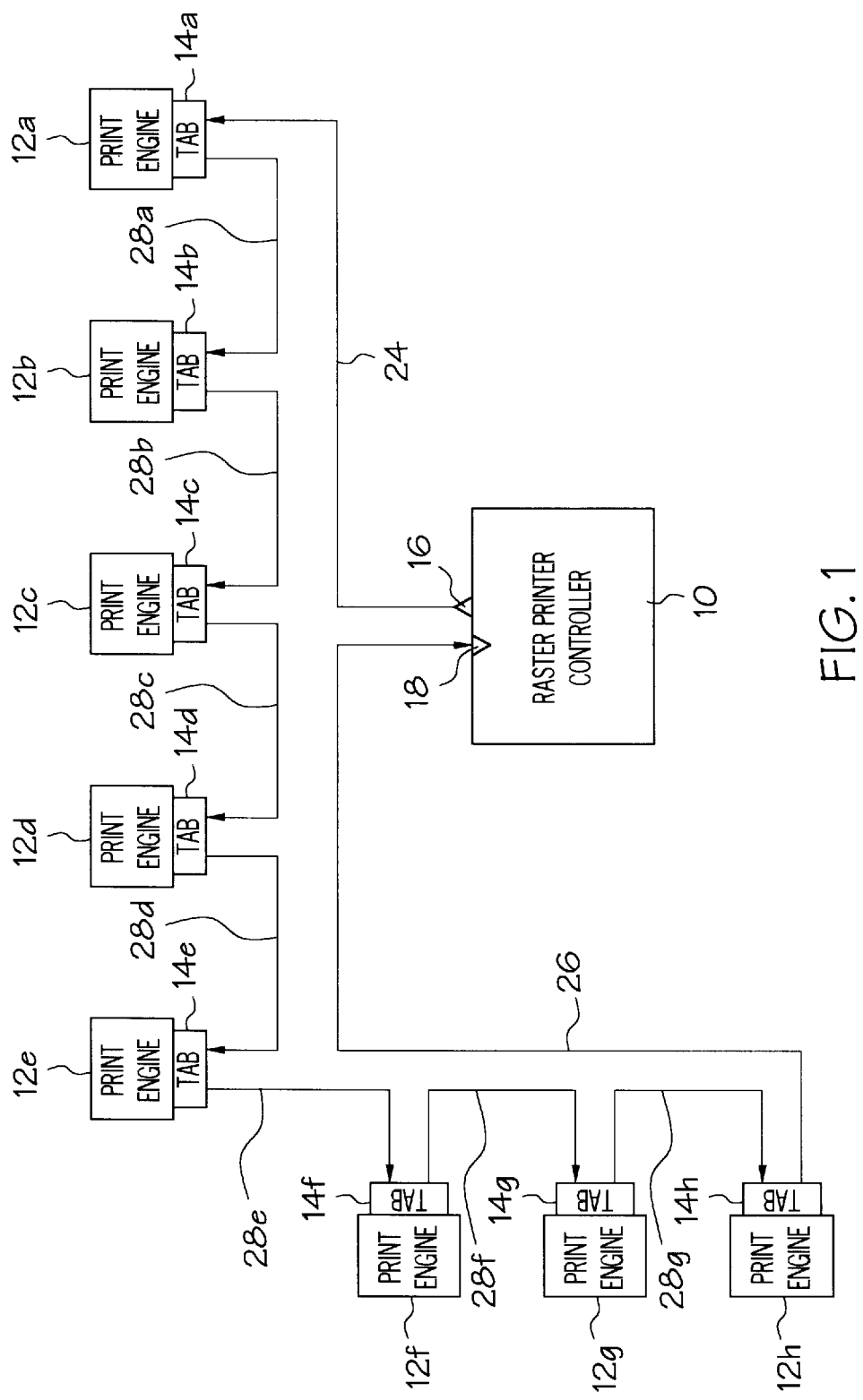
FIG. 1 is a schematic block diagram of the present invention, depicting a plurality of print engines being controlled by a single printer controller, the print engines and the controller being coupled in a daisy-chain configuration.

As shown in FIG. 1, a high speed raster printer controller 10 is used to simultaneously drive a plurality of print engines 12a–12h. The high speed raster printer controller 10 is preferably a multi-processor system for interpreting and processing an image or images defined by a page description language and for dispatching rasterized bitmap data generated by the processing of the page description language as described, for example, in U.S. patent application Ser. No. 08/558,007, filed Nov. 13, 1995. Each print engine 12a–12h is coupled to one of a plurality of print engine communication devices, hereinafter referred to as "target adapter boards" ("TAB") 14a–14h. For the purposes of this disclosure, when it is disclosed that one component is "coupled" to another component, it will mean that the one component is linked to the other component by any data link such as an electronic data link (wires or circuits), a fiber optic data link, an RF (radio frequency) data link, an infrared data link, an electromagnetic data link, a microwave data link, or any other type of data link known to one of ordinary skill in the art.

Each TAB 14a–14h provides an interface between the raster printer controller 10 and the respective plurality of print engines 12a–12h. Preferably each TAB includes a universal controller interface section to provide a means to communicate with the raster printer controller 10; and a customized print engine interface section which provides a direct interface between the print engine electronics and the raster printer controller 10.

The raster printer controller 10 includes a data output port 16 and a data input port 18. The data output port is preferably a fiber optic transmitter and the data input port 18 is preferably a fiber optic receiver. Each of the TABs 14a–14h also includes an input port 20 and an output port 22 (see FIG. 2); where the input port 20 is preferably a fiber optic receiver and the output port is preferably a fiber optic transmitter. Therefore, both the raster printer controller 10 and the plurality of TABs 14a–14h each have full duplex communications via fiber optics.

As is further shown in FIG. 1, the raster printer controller 10 is coupled to the plurality of TABs 14a–14h in a daisy-chain or in a "ring" fashion. Preferably, the raster printer controller 10 transmits a command/data stream to the first TAB 14a on the ring over a fiber optic link 24; the last TAB 14h on the ring transmits command/data stream back to the raster printer controller 10 over a fiber optic link 26; and each of the TABs 14a–14g transmit command/data stream to the next TAB on the ring, over fiber optic links 28a–28g. The fiber optic links 24, 26, 28a–28g provide substantial electrical isolation and immunity from excessive high voltages associated with print engine electronics. The fiber optic links are also scalable in design, i.e., their data rates can be easily slowed down if desired.

Each TAB is configured to transmit the entire command/data stream received on its input port 20 back to its output port 22. Accordingly the raster printer controller 10 will transmit the command/data stream to the first TAB 14a on the ring. The command/data stream will flow in the same direction along the daisy-chain to the rest of the TABs 14b–14h, and eventually it will flow from the last TAB 14h on the ring back to the raster printer controller 10. This configuration allows all of the TABs to see all of the command/data stream all of the time.

Figure 2:
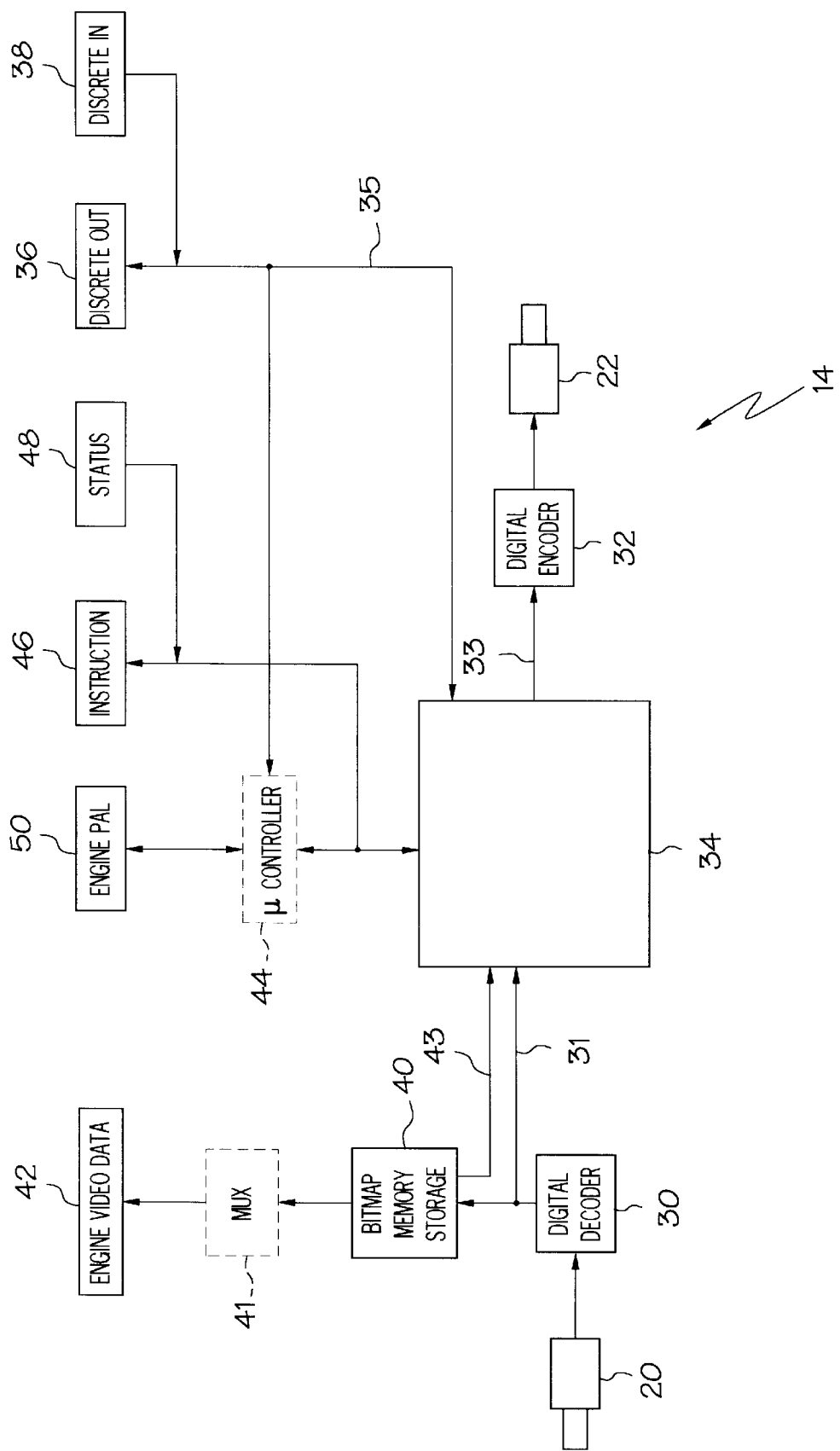
FIG. 2 is a schematic block diagram of a print engine communication device for use with the present invention.

As shown in FIG. 2, each TAB 14 includes a digital decoder 30 for decoding the data stream received by the fiber optic receiver 20 into raw digital input data 31, and a digital encoder 32 for transforming the raw digital output data 33 into an encoded data stream to be transmitted by the fiber optic transmitter 22. Also included on each TAB is a high-speed message processing circuit 34, coupled between the decoder 30 and encoder 32. The high-speed message processing circuit 34 is designed to monitor the digital input data 31 and to execute the commands embedded in the command/data stream when the embedded TAB address field matches the TAB's internal address. The high speed message processing circuit 34 also continuously retransmits this digital input data 31 to its fiber optic encoder 32 as digital output data 33, which is in turn transmitted back to the ring by the fiber optic transmitter 22.

Preferably, the high-speed message processing circuit 34 is a non-intelligent device, that is, it is a "hardware" device whose internal functions are not directed by a software program. Therefore the high-speed message processing circuit is very fast and is able to handle the bandwidth requirements for the multiplexed command/data protocol structure described below. Furthermore, the high-speed message processing circuit 34 is not as susceptible to the errors and failures which may commonly occur in software controlled devices. The high-speed message processing circuit 34 may be fabricated from standard TTL devices, CMOS devices, 7400 series logic, or incorporated into single or multiple chip implementations such as programmable logic arrays (PALs), field programmable gate arrays (FPGAs), application specific integrated circuits (ASICs) or any hardware description language (HDL) based device; and in a preferred embodiment, the high-speed message processing circuit 34 is an ASIC device.

The high-speed message processing circuit 34 is coupled to a discrete output buffer 36 and a discrete input buffer 38 via a data bus 35. In executing commands transmitted by the raster printer controller, the high-speed message processing circuit 34 can set or reset lines on the discrete output buffer 36 and can report back to the raster printer controller messages pertaining to the status of lines on the discrete input buffer 38. Such output discretes can include, for example, "print on-line," "printer reset," and "reset communications." Such input discretes can include, for example, "engine error." Thus, the discrete buffers provide a mechanism for handling general purpose I/O requirements of a printer.

The TAB 14 also includes a bitmap data memory storage buffer 40 which interfaces directly to the corresponding print engine's video data input port 42. Therefore, the message processing circuit 34 is also designed to update the bitmap data memory storage buffer 40 when commanded by the raster printer controller 10. This bitmap data memory storage buffer, in the preferred embodiment, is a FIFO buffer; however, the bitmap data memory storage buffer 40 may also be video memory, a single byte of memory (i.e., a register), a dram array, or any other type of memory device as required by the design of the print engine interface. Also, it may be desirable to couple a multiplexor device 41 between the print engine's video data input port 42 and the bitmap data memory storage buffer 40.

The bitmap memory storage buffer 40 includes a status line 43 (such as "memory not full"), coupled to the high-speed communication circuit 34. This status line 43 can indicate to the high-speed communication circuit, and in turn to the raster printer controller 10 (via a message sent over the daisy-chain back to the controller), the need for additional rasterized bitmap data. The raster printer controller can utilize this information in order to dispatch the bitmap data to the various print engines in an on-demand manner. Further, an arbitration scheme within the raster printer controller keeps track of the dispatch history (the order of the bitmap data sent to the various print engines), and upon receiving multiple requests for bitmap data (from multiple TABs), the raster printer controller will be able to dispatch bitmap data to the TAB that received a bitmap packet the longest time prior. Therefore, the raster printer controller will be able to supply the print engines with bitmap data when they need it, independent of the print engine resolutions.

Some print engines require a higher level of communication than simple discrete inputs and outputs, and correspondingly, the TAB may require additional intelligence to interface and communicate with these types of print engines. Therefore, the TAB may also include an optional on-board CPU 44 which can be used to manage higher level tasks as warranted by some types of print engines; an instruction port 46 controlled by the message processing circuit 34 or the on-board CPU 44, which can be used as part of the print engine interface to transmit print engine instructions (otherwise known as "print engine commands") and instruction parameters (otherwise known as "print engine command parameters") to the print engine; a print engine status buffer 48 monitored by the message processing circuit 34 or the on-board CPU 44, which can be used to access print engine status information from the print engine; and a customized programmable array logic (PAL) device 50, controlled by the on-board CPU 44, which provides logic circuits adapted to communicate with the particular print engine.

The discrete output buffer 36, the discrete input buffer 38, the bitmap data memory storage buffer 40, and the other print engine interface components described above, therefore, provide an interface between the print engine and the fiber optic ring, and which provides a means for the raster printer controller 10 to control the operation of the corresponding print engine through commands embedded in the command/data stream sent over the ring. Furthermore, this design allows the raster printer controller 10 to utilize a multiplexed command/data protocol for communicating with the plurality of TABs 14a–14h, in which the raster printer controller transmits a command followed by a corresponding data-stream on the fiber optic ring.

It may also be desirable, and it is within the scope of the invention, to include a plurality of discrete output buffers 36, discrete input buffers 38, memory storage buffers 40, instruction buffers 46, and/or status buffers 48 on a single TAB, for interfacing with and controlling a corresponding plurality of identical or substantially similar print engines. It is also within the scope of the invention to couple only one TAB on the ring, whether the TAB is driving a plurality of print engines or not. Even with only a single TAB on the ring, the present invention is still advantageous because the present invention allows the TAB and print engine to be easily replaced, and allows more TABs and print engines to be easily added to the ring.

The raster printer controller 10 initiates all commands and manages the allocation of fiber optic bandwidth to receive all print engine status. Each command contains an address field, and each TAB includes its own internal address. Thus, each TAB 14a–14h monitors the commands using their respective high-speed message processing circuits 34, and if addressed, the TABs respond appropriately. A TAB 14a–14h will never respond to a command unless that particular TAB is addressed by the command. Nevertheless, as discussed above, even if the particular TAB is not addressed by the command, its message processing circuit 34 will always retransmit that command and corresponding data-stream to the next TAB on the daisy-chain (or if the present TAB is the last TAB 14h on the daisy-chain, back to the raster printer controller). This allows all TABs 14a–14h to see all of the commands all of the time. Additionally, the address field may include a broadcast bit which will indicate, if active, that every TAB is to receive the command/data-stream associated therewith.

An example command/data stream protocol for use with the present invention may include the following general purpose commands (this is not a comprehensive list of commands):

Command 1: RESET  Execute a reset operation at the specified destination.
Upon receiving this command, the TAB will cease execution of its current command and execute this reset command. The TAB will then enter an idle state and it will then wait and listen for the raster printer controller to send the TAB another command.
Command 2: DATA  Raster printer controller transmitting a bitmap data block to a specified destination.
Associated Data:  <Bitmap Data Block>
Command 3: PRINT TRIGGER  Issue a print trigger (start stroking real data to print engines).
This command can be sent by the raster printer controller at any time. This command temporarily suspends execution of the current command in order to execute this command. For example, this command can actually be injected in the middle of a bitmap data stream as specified by a previous DATA command. Immediately after executing the PRINT TRIGGER command, the TAB will continue executing the previous data command (e.g., accepting bitmap data from the raster printer controller).

-continued

Command 4: STATUS REQUEST  Request for printer status.
Upon receiving this command, the TAB will suspend execution of its current command in order to execute this command. The TAB will respond with a one byte response to the raster printer controller which will indicate whether it is ready to honor the status request command. Once this command is executed, the TAB will resume execution of its previously suspended command.
Command 5: SEND STATUS  Send the TAB status now.
Upon receiving this command, the TAB will cease execution of its current command and execute this command. The TAB responds immediately to this command and then transmits its updated print status packet to the raster printer controller.

Figure 3:
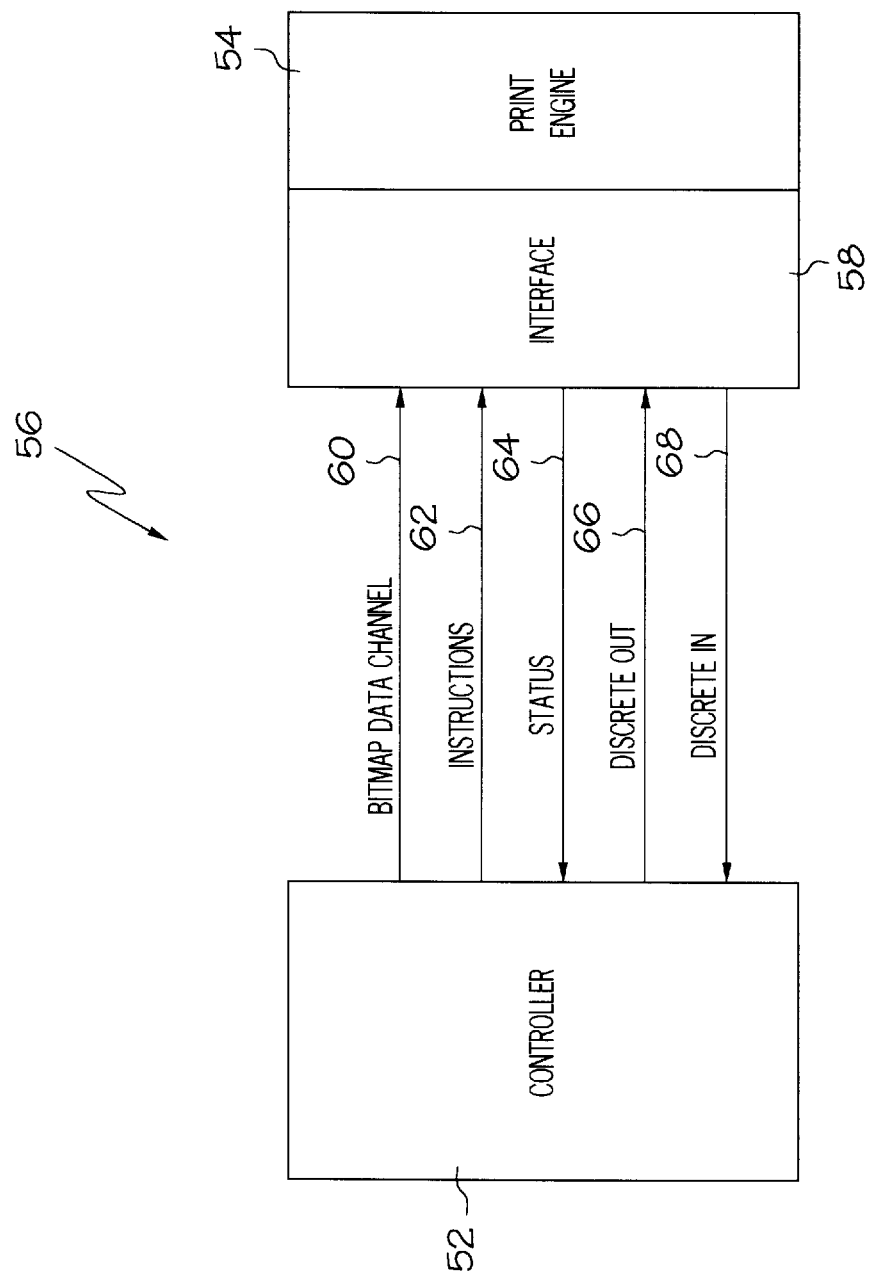
FIG. 3 is a schematic block diagram of the command and data communication configuration for an example prior art printer controller and an example print engine.

The advantage of the present invention's multiplexed command/data protocol for communicating with the plurality of print engines can be illustrated by the following example. As shown in FIG. 3, a typical prior art command/data protocol scheme for interfacing a print engine controller 52 with a print engine 54 requires a multitude of data links 56 extending between the controller 52 and the controller interface 58 on the print engine. Such data links 56 typically include a bitmap data channel 60, which is typically a serial or parallel bus data link over a copper wire, differential bus or fiber optic link; an instruction bus 62, which is typically over an RS232, RS422, RS485, 8-bit parallel or 16-bit parallel data bus; a status bus 64, which is also typically an RS232, RS422, RS485, 8-bit parallel or 16-bit parallel data bus; discrete-out lines 66, which are typically individual output signals; and discrete-in lines 68, which are typically individual input signals.

Figure 4:
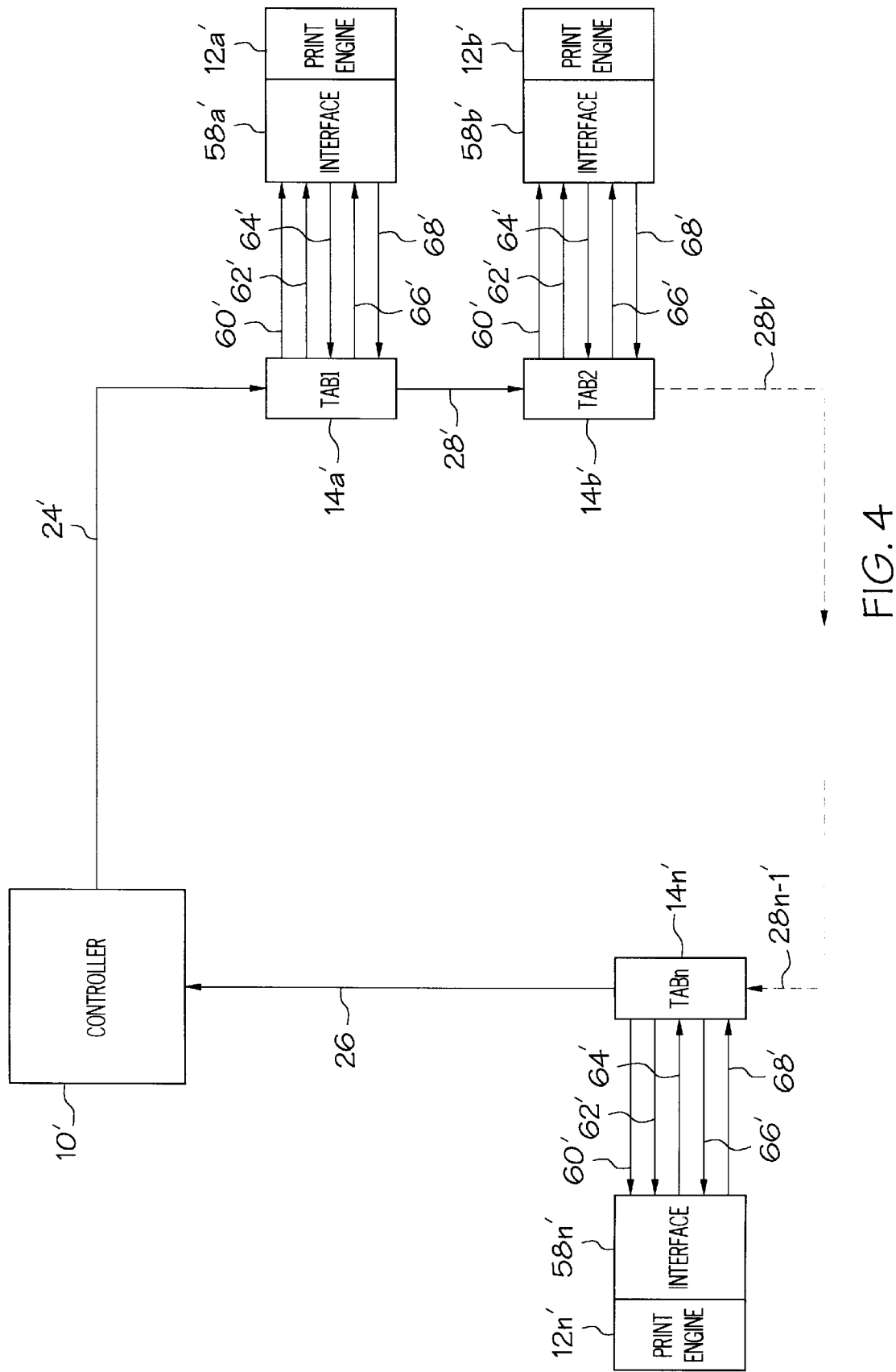
FIG. 4 is a schematic block diagram of the multiplexed command and data communication configuration of the present invention utilized to control a plurality of the example print engines.

As shown in FIG. 4, if the present invention were utilized to control a plurality of the above example print engines 12a'–12n', the raster printer controller 10' would communicate to the print engines 12a'–12n' by transmitting a multiplexed command/data stream over the fiber optic ring comprised of fiber optic links 24', 26' and 28a'–28(n–1)'. As described above, each TAB 14a'–14n' receives each command and associated data transmitted over the ring; and if addressed, the TAB translates and executes the command embedded in the command/data stream. Execution of this command may, for example, enable transmission of a bitmap data block over a bitmap data channel 60' to the controller interface 58a–58n, may transmit print engine instructions over an instruction bus 62' to the controller interface, may access print engine status over a status bus 64' from the controller interface, may set or reset individual discrete signals 66' on the controller interface, or may monitor individual discrete signals 68' on the print engine interface. Thus, the controls for each of the print engines 12a'–12n' are multiplexed into a command/data stream, transmitted over the single fiber optic data link by the raster printer controller. This substantially reduces cabling requirements and allows the controller to easily operate a plurality of print engines, and even a different combination of print engines having different print resolutions, at the same time.

Referring again to FIGS. 1 and 2, each TAB 14a–14h is configured to be automatically addressable by the raster printer controller 10, which means that the plurality of TABs can be connected in any order and in any combination within the daisy-chain ring, and that any number of TABs can be placed on the ring. However, in a preferred embodiment, the number of TABs on the ring, and operated by the raster printer controller 10, is limited to sixteen.

As discussed above, the embedded command in the command/data stream transmitted on the ring by the raster printer controller 10 includes an address field, which specifies which TAB is to receive the command. However, in the preferred embodiment every TAB is set up with an identical predefined internal address of zero (address=0); and further, every TAB is configured to modify the address field of every command received by decrementing the address field by one prior to retransmitting the command/data stream back to the ring. Thus, for example, if there are eight TABs on the ring, and the raster printer controller intends to transmit a command to the eighth TAB on the ring, the address field of the command sent to the first TAB on the ring will equal seven. The first TAB will not accept the command because the address field does not equal zero. The first TAB will subtract one from the address field, and it will then retransmit the command to the second TAB on the ring. The second TAB will not accept the command because the address field does not equal zero (address field now equals six). The second TAB will subtract one from the address field, and it will then retransmit the command to the third TAB on the ring. This is repeated for each TAB until the command finally reaches the eighth TAB on the ring. At this time, the address field equals zero, and therefore, the eighth TAB on the ring will accept and process the command. Because the eighth TAB does not know that it is the last TAB on the ring, it will also decrement the value of the address field prior to retransmitting the command back to the raster printer controller.

When the raster printer controller 10 boots up, it does not know the number of TABs 14a–14h on the ring, nor the types or configuration (i.e., resolution) of the print engines 12a–12h coupled to the TABs. Accordingly, the raster printer controller will send an initialization command to the ring. The address field of this initialization command will be decremented by each of the TABs on the ring; and thus, upon receiving the initialization command back from the ring, the raster printer controller will be able to determine the number of TABs on the ring and it will know how to address each of the TABs based upon the number of times the address field has been decremented prior to receiving the initialization command back from the ring.

Immediately thereafter, the raster printer controller will send a configuration request command with the address field equal to zero to the first TAB on the ring. This configuration request command is received by the first TAB because the address field of the command equals zero. The first TAB responds to this configuration request by returning a configuration response message to the controller indicating the identity and attributes of its corresponding print engine. Prior to retransmitting the configuration request command back to the ring, however, the first TAB will decrement the address field by one such that none of the other TABs will answer the command.

Once the raster printer controller has received the response message from the first TAB, the controller will send a second configuration request command to the ring with an address field equal to one. Thus, the first TAB on the ring will not respond to this command and will also retransmit this command back to the ring with a decremented address field now equal to zero. This command will be processed by the second TAB because the address field now equals zero; and prior to retransmitting the command back to the ring, the second TAB will again decrement the address field such that none of the other TABs will answer the command. The raster printer controller will repeat this sequence of transmitting configuration request commands with incremented address fields to all of the TABs on the ring. At this point the raster printer controller will know how many TABs are on the ring, how to address each of the TABs on the ring, and will also know the configuration and characteristics of every print engine coupled to a TAB on the ring. This makes cabling very simple and straightforward since the ring can be attached in any order, and the dynamic addressing scheme eliminates the need to physically reconfigure the TABs' internal addresses when the ring configuration changes. This scheme also helps to facilitate the mix of different marking technologies on the same ring because the raster printer controller will know the identities and attributes (i.e., resolutions) of all the print engines on the ring.

In one embodiment, the present invention also provides a mechanism to simultaneously control a plurality of ink-jet printing heads. Each ink-jet printing head is data-coupled to a corresponding TAB on the ring, and the corresponding TAB is controlled by the raster printer controller to deliver stroke data to the ink-jet printing head on every piezo cycle all of the time. Upon receipt of the PRINT TRIGGER command (see above), the TAB will immediately transfer an entire stroke of real bitmap data to the corresponding print head. Then on the subsequent piezo cycle, the data is stroked onto the substrate. Once the data has been printed, the TAB then resumes sending NULL data.

While the system described herein constitutes preferred embodiments of the invention, it is to be understood that the present invention is not limited to its precise form, and that variations may be made without departing from the scope of the invention as set forth in the following claims.

What is claimed is:

1. A printer comprising:

a plurality of print engines;

a raster printer controller including a processor for generating rasterized bit-map data, an output port, and an input port; and a plurality of print engine communication devices, each of said communication devices including an input port, an output port, and a print engine interface;

each of said print engine interfaces being coupled to a corresponding one of the print engines to provide the rasterized bit-map data to the corresponding print engine;

said input ports and output ports of said communication devices being coupled together with said input port and said output port of said raster printer controller in a daisy-chain configuration by a data link;

each of said communication devices including a message processing circuit, adapted to monitor data received on said input port of said communication device and to continuously re-transmit said data received on said input port to said output port of said communication device, said message processing circuit being adapted to execute commands embedded in said data received on said input port;

each of said communication devices further including at least one input discrete line and at least one output discrete line coupled to the corresponding print engine, and said message processing circuit transmitting a signal on said output discrete line or polling a signal on said input discrete line responsive to one of said commands.

2. A printer comprising:

a plurality of print engines;

a raster printer controller including a processor for generating rasterized bit-map data, an output port, and an input port; and a plurality of print engine communication devices, each of said communication devices including an input port, an output port, and a print engine interface;

each of said print engine interfaces being coupled to a corresponding one of the print engines to provide the rasterized bit-map data to the corresponding print engine;

said input ports and output ports of said communication devices being coupled together with said input port and said output port of said raster printer controller in a daisy-chain configuration by a data link;

each of said communication devices including a message processing circuit, adapted to monitor data received on said input port of said communication device and to continuously re-transmit said data received on said input port to said output port of said communication device, said message processing circuit being adapted to execute commands embedded in said data received on said input port;

each of said print engine interfaces including a bitmap data memory storage buffer, and, responsive to one of said commands, said message processing circuit updates said bitmap data memory storage buffer with rasterized bitmap data embedded in said data received on said input port; and at least two of the print engines including different interface requirements and said print engine interfaces of said corresponding communication devices are customized to interface with said corresponding print engines.

3. The system of claim 2, wherein said two print engines include different print resolutions.

4. A printer comprising:

a plurality of print engines;

a raster printer controller including a processor for generating rasterized bit-map data, an output port, and an input port; and a plurality of print engine communication devices, each of said communication devices including an input port, an output port, and a print engine interface;

each of said print engine interfaces being coupled to a corresponding one of the print engines to provide the rasterized bit-map data to the corresponding print engine;

said input ports and output ports of said communication devices being coupled together with said input port and said output port of said raster printer controller in a daisy-chain configuration by a data link;

each of said communication devices including a message processing circuit, adapted to monitor data received on said input port of said communication device and to continuously re-transmit said data received on said input port to said output port of said communication device, said message processing circuit being adapted to execute commands embedded in said data received on said input port;

each of said print engine interfaces including a bitmap data memory storage buffer, and, responsive to one of said commands, said message processing circuit updates said bitmap data memory storage buffer with rasterized bitmap data embedded in said data received on said input port; and said bit-map data memory storage buffer including a status line for indicating a need for additional rasterized bit-map data, and said message processing circuit being adapted to transmit a message on said output port indicative of said status line such that said raster printer controller will be able to perform on-demand dispatching of the rasterized bit-map data to the print engines.

5. The system of claim 4, wherein said raster printer controller includes a dispatch history table which indicates the order in which each of the plurality of the print engines have been dispatched the rasterized bit map data, whereby said raster printer controller will be able to determine a priority for dispatching subsequent rasterized bitmap data.

6. A method for controlling a printer having a plurality of print engines and a print engine controller, comprising the steps of:

coupling at least one print engine communication device to said print engine controller in a daisy chain configuration with a data link;

interfacing said plurality of print engines with said data link by coupling each of said print engine communication devices to at least one corresponding print engine;

embedding commands and data in a data stream;

transmitting said data stream on said data link to said print engine communication device;

relaying said data stream from said print engine communication device back to said data link; and receiving said data stream back from said data link;

wherein the print engine communication device extracts a command from said data stream and executes said command;

wherein, in the course of executing said command, said print engine communication device will extract bitmap data from said data stream and place said bitmap data in a memory storage buffer coupled to a video data input port on said corresponding print engine;

wherein the method further comprises the step of transmitting a message from said print engine communication device to said print engine controller over said data link, said message indicating that said memory storage buffer is ready to receive additional bitmap data such that said print engine controller will be able to perform on-demand dispatching of the bitmap data to the print engines.

7. The method of claim 6, further comprising the step of determining a priority for embedding and transmitting bitmap data on said data link by consulting a dispatch history table.

* * * * *